(12) United States Patent
Wilson

(10) Patent No.: US 6,798,910 B1
(45) Date of Patent: Sep. 28, 2004

(54) SELF-OPTIMIZING EDGE DETECTION IN BLURRED, HIGH-NOISE IMAGES

(75) Inventor: Kelce S. Wilson, Huber Heights, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 691 days.

(21) Appl. No.: 09/858,456

(22) Filed: May 17, 2001

(51) Int. Cl.[7] .................................................. G06K 9/48
(52) U.S. Cl. ........................ 382/199; 382/266; 382/264
(58) Field of Search ................................. 382/199, 201, 382/205, 254, 260, 264, 275, 279, 270, 272, 273, 266

(56) References Cited

U.S. PATENT DOCUMENTS

| | | | |
|---|---|---|---|
| 4,330,833 A | | 5/1982 | Pratt et al. |
| 4,720,871 A | * | 1/1988 | Chambers .................... 382/278 |
| 4,918,742 A | | 4/1990 | Simonds |
| 5,022,091 A | | 6/1991 | Carlson |
| 5,081,692 A | * | 1/1992 | Kwon et al. ................. 382/263 |
| 5,748,792 A | | 5/1998 | Wober |
| 6,064,768 A | | 5/2000 | Hajj et al. |
| 6,072,904 A | | 6/2000 | Desai et al. |
| 6,094,511 A | | 7/2000 | Metcalfe et al. |
| 6,687,300 B1 | * | 2/2004 | Fujita et al. ............ 375/240.16 |

OTHER PUBLICATIONS

Fong–chao Wu, Comparison of Edge Detectors, 1–12, www–aaa.eng.ohio–state.edu/~wuf/study/paper/content.htm (Sep. 12, 2000).

Other Methods of Edge Detection, 1–7, www.owlnet.rice.edu/~elec539/projects97/morphjrks/moredge.html (Sep. 12, 2000).

Jordan, Ramiro et al., Edge Detection II, 1–3, seville-ta.unm.edu/~bmilne/khoros/html–dip/c9/s2/front–page-.html (Sep. 12, 2000).

Image Processing Khorosware; Edge Detection I, 1–6, www.ee.ghu.ac.il/~greg/graphics/special.html (Sep. 12, 2000).

* cited by examiner

*Primary Examiner*—Yon J. Couso
(74) *Attorney, Agent, or Firm*—Gerald B. Hollins; Thomas L. Kundert; David E. Franklin

(57) ABSTRACT

An apparatus, program product and method detect region boundaries, or edge, of an arbitrary number of pixels in width in a digital image that has coarse resolution, high noise levels and/or significant blur. A self-optimizing kernel generator detects edges of arbitrary thickness. In addition, combining results of multi-resolution edge detection provides significant noise tolerance, such as a 10 dB improvement over conventional techniques. Moreover, the edge detection preserves the precise location of a blurred edge and quantifies image clarity.

19 Claims, 8 Drawing Sheets

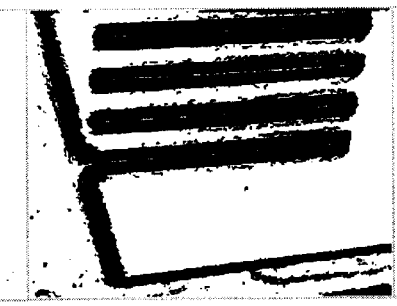 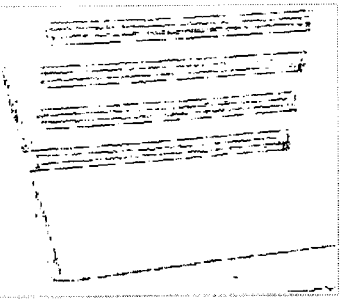
FIG. 11A     FIG. 11B     FIG. 11C
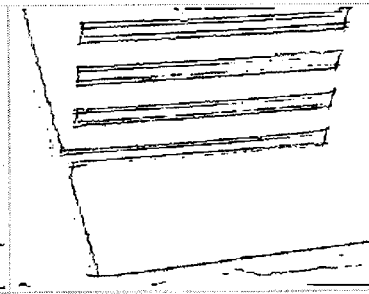 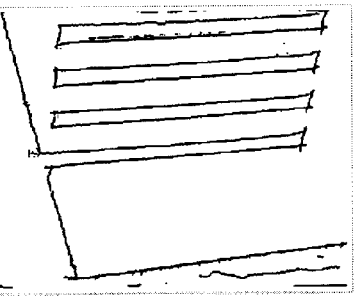
FIG. 11D     FIG. 11E     FIG. 11F
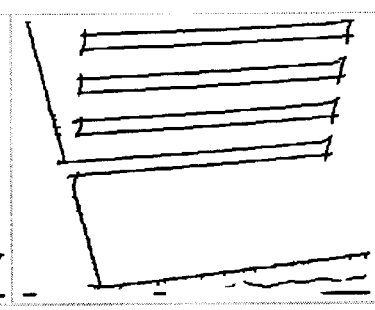 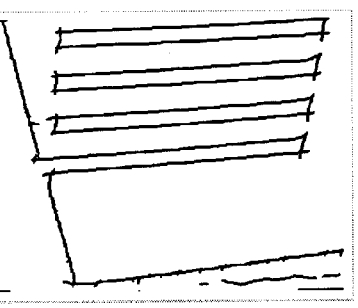
FIG. 11G     FIG. 11H     FIG. 11I

SELF-OPTIMIZING EDGE DETECTION IN BLURRED, HIGH-NOISE IMAGES

RIGHTS OF THE GOVERNMENT

The invention described herein may be manufactured and used by or for the Government of the United States for all governmental purposes without the payment of any royalty.

FIELD OF THE INVENTION

The invention is generally related to computers and computer software. More specifically, the invention is generally related to a manner of edge detection in image processing.

BACKGROUND OF THE INVENTION

Traditional edge detection methods have generally required a high enough signal to noise ratio and fine enough image clarity that the transition from one region to another does not significantly exceed a single pixel in width. Even edge detection methods that have been adapted to noisy images still appear to carry the assumption that the noise is superimposed on top of an image with edges that do not exceed a single pixel in width.

In essence, edge detection has traditionally been a form of high-pass filtering, although in noisy images it performs better when implemented as a band-pass filter process. Since speckle noise has a definite high frequency component, the best results will naturally come from a process that excludes as much noise energy from the detection process as possible. In certain images, such as highly magnified images, low light images, or pictures taken of a moving object or where the camera is moved, the displayed resolution creates a non-negligible spatial auto-correlation among the pixel amplitudes. Thus, edges become border regions with non-zero width.

Images that have blur or noise conventionally cannot receive the benefits of edge detection. For example, digital photography effects such as embossing or conversion to a line drawing are not readily available. Certain artificial intelligence applications rely upon interpreting a scene. In some application, these limitations are partially offset by having knowledge of the expected shape and edge thickness of objects within a digital image so that a tailor-made template may be used for detection.

Consequently, a significant need exists for a way to tune the spectral response of edge detection to accommodate only the bandwidth of a natural edge in a particular image, and reject as much of the high frequency noise energy as possible, yet not require beforehand knowledge of the characteristics of the image clarity.

SUMMARY OF THE INVENTION

The invention addresses these and other problems associated with the prior art by providing an apparatus, program product and method in which "Wilson" horizontal and vertical edge detection kernels are formed of various sizes, each size sensitive to detecting edge widths of various sizes. Repeating convolution of a digital image with various sizes of Wilson kernels achieves edge detection even when the size of the edge is not known in advance.

In one aspect of the invention, an image is subjected to a series of edge detection processes using kernels tailored to border regions of increasing width, until the natural edge width is found. In blurred images, such a process yields improving results with successive iterations until the natural edge width for that particular image is reached. Further increasing the width of the kernel does not yield significant improvement, but rather begins to cause a loss of features, so the process is then halted. There are at least two advantages to this approach. First, since the method is noise tolerant, edges may be found in images otherwise too noisy or coarse for traditional approaches. Second, a measure of the natural edge width quantifies the blur in the image and acts as a metric for clarity.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 11 is a digital image including coarse resolution, noise and blur.

FIGS. 11A–11I are illustrative output results from edge detection using Wilson kernels size N=0 to 8 respectively.

DETAILED DESCRIPTION

Detection of multi-pixel edge regions in an image is achieved by an adaptive approach, wherein edge detection kernels are selected to accommodate the various pixel widths of the edge. In addition, an edge detection operation is performed when the edge detection kernels of various sizes have been used on the image. The edge detection operation may include multiplying the results achieved by each kernel for increased noise reduction or comparing the results from each kernel to determine the optimum kernel size for the natural edge width.

Figure 1:
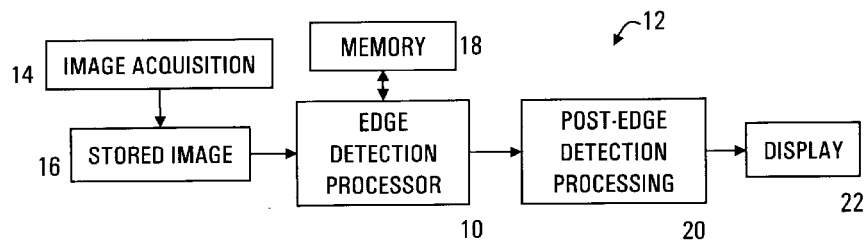
FIG. 1 depicts a block diagram of an edge detection processor within an image-processing environment.

Turning to the drawings, wherein like numbers represent similar items throughout the several figures, FIG. 1 illustrates an edge detection processor 10 consistent with aspects of the present invention as part of an image processing system 12. An image acquisition device 14, such as a digital camera, prepares a digital image that is made available to the edge detection processor 10 as a stored image 16. The processor 10 may be incorporated as part of the image acquisition device 14 or be a separate device. The edge detection processor 10 processes the stored image 16 in a memory 18. The edge detection result is provided to post-edge detection processing 20 and then presented on a display 22.

Figure 2:
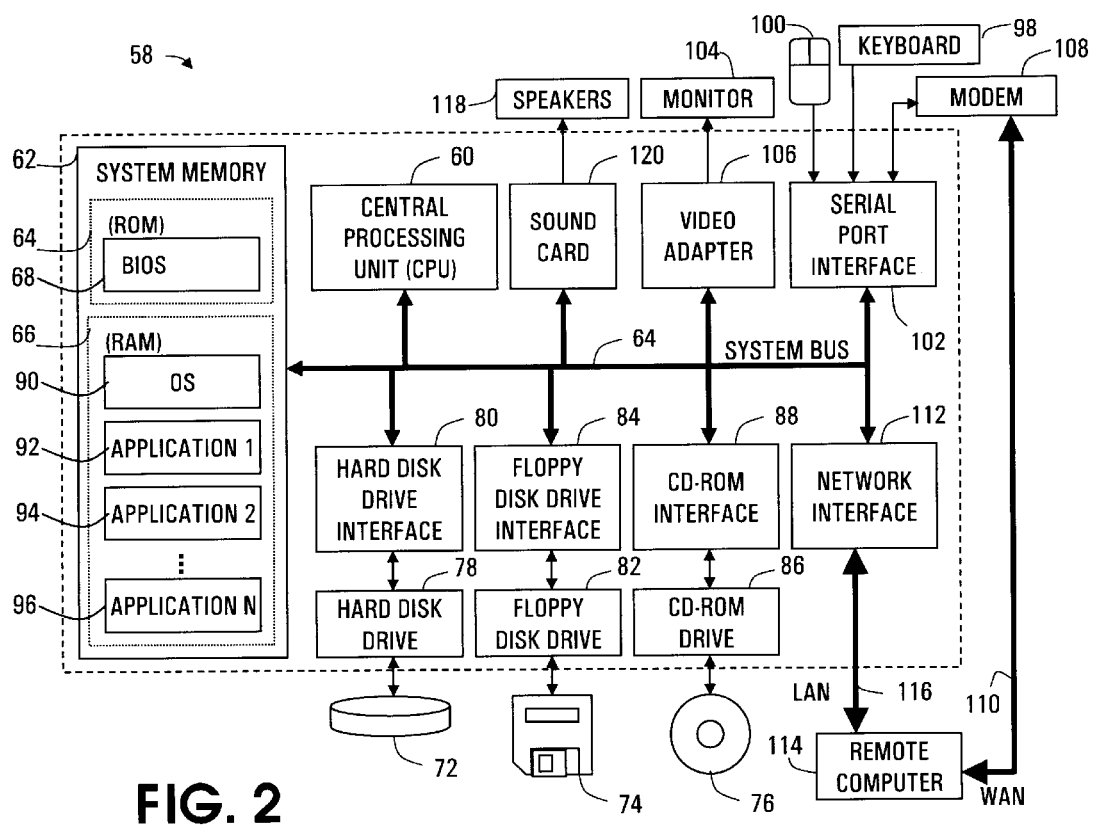
FIG. 2 is an illustrative computer system for performing edge detection processing in the image-processing environment of FIG. 1.

FIG. 2 illustrates in another way an exemplary hardware and software environment for an apparatus 58 consistent with the invention. For the purposes of the invention, apparatus 58 may represent practically any type of computer, computer system, or other programmable electronic device, including a computer (e.g., similar to computers 12–16 of FIG. 1), a server computer, a portable computer, a handheld computer, an embedded controller, etc. Apparatus 58 may be coupled in a network as shown in FIG. 1, or may be a stand-alone device in the alternative. Apparatus 58 will hereinafter also be referred to as a "computer", although it should be appreciated that the term "apparatus" may also include other suitable programmable electronic devices consistent with the invention.

Computer 58 typically includes at least one processor 60, depicted as a CPU, coupled to a system memory 62. A system bus 64 couples various system components, including system memory 62, to CPU 60. System bus 64 may be any of several types of bus structures, including a memory bus or memory controller, a peripheral bus, and a local bus using any of a variety of architectures. Processor 62 may represent one or more processors (e.g., microprocessors), and memory 62 may represent read-only memory (ROM) 64 and random access memory (RAM) 66 comprising the main storage of computer 58, as well as any supplemental levels of memory, for example, cache memories, non-volatile, or backup memories (e.g., programmable or flash memories), read-only memories, etc. A basic input/output system (BIOS) 68, containing the basic routines that help to transfer information between elements within computer 58, such as during start-up, is stored in ROM 64. In addition, memory 62 may be considered to include memory storage physically located elsewhere in computer 58, (e.g., any cache memory in a processor 60), as well as any storage capacity used as a virtual memory, for example, as stored on a mass storage device or on another remote computer. Computer 58 has mass storage devices including a (typically fixed) magnetic hard disk 72, a removable "floppy" or other magnetic disk 74, and a CD-ROM, or other optical media 76. The computer 58 may further include other types of mass storage such as direct access storage device (DASD), tape drive, etc. A hard disk drive 78 for hard disk 72 is connected to the system bus 64 via a hard disk drive interface 80. A floppy disk drive 82 for floppy disk 74 connects to the system bus 64 via a floppy disk drive interface 84. A CD-ROM drive 86 for CD-ROM 76 connects to the system bus 64 via a CD-ROM interface 88.

A number of program modules are stored on mass storage media and/or ROM 64 and/or RAM 66 of system memory 62. Such program modules may include an operating system 90, providing graphics and sound application program interfaces (API), one or more application programs 92–96, other program modules, and program data.

In general, the routines executed to implement the embodiments of the invention, whether implemented as part of an operating system or a specific application, component, program, object, module, or sequence of instructions, will be referred to herein as "computer programs," or simply "programs." The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms and that the invention applies equally, regardless of the particular type of signal bearing media used to actually carry out the distribution. Examples of signal bearing media include, but are not limited to, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

A user may enter commands and information into the computer 58 through input devices such as a keyboard 98 and a pointing device 100. Other input devices may include a microphone joystick, game controller, satellite dish, scanner, or the like. These and other input devices are often connected to processing unit 60 through a serial port interface 102 that is coupled to system bus 64, but may be connected by other interfaces, such as a parallel port interface or a universal serial bus (USB). A monitor 104 or other type of display device is also connected to system bus 64 via an interface, such as a video adapter 106.

Computer 58 may also include a modem 108 or other means for establishing communications over wide area network (WAN) 110, such as communication network 12. Modem 108, which may be internal or external, is connected to system bus 64 via serial port interface 102. A network interface 112 may also be provided for allowing computer 58 to communicate with a remote computer 114 via local area network (LAN) 116 (or such communication may be via wide area network 110 or other communications pat such as dial-up or other communications means). Computer 58 typically includes other peripheral output devices, such as printers and other standard devices.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
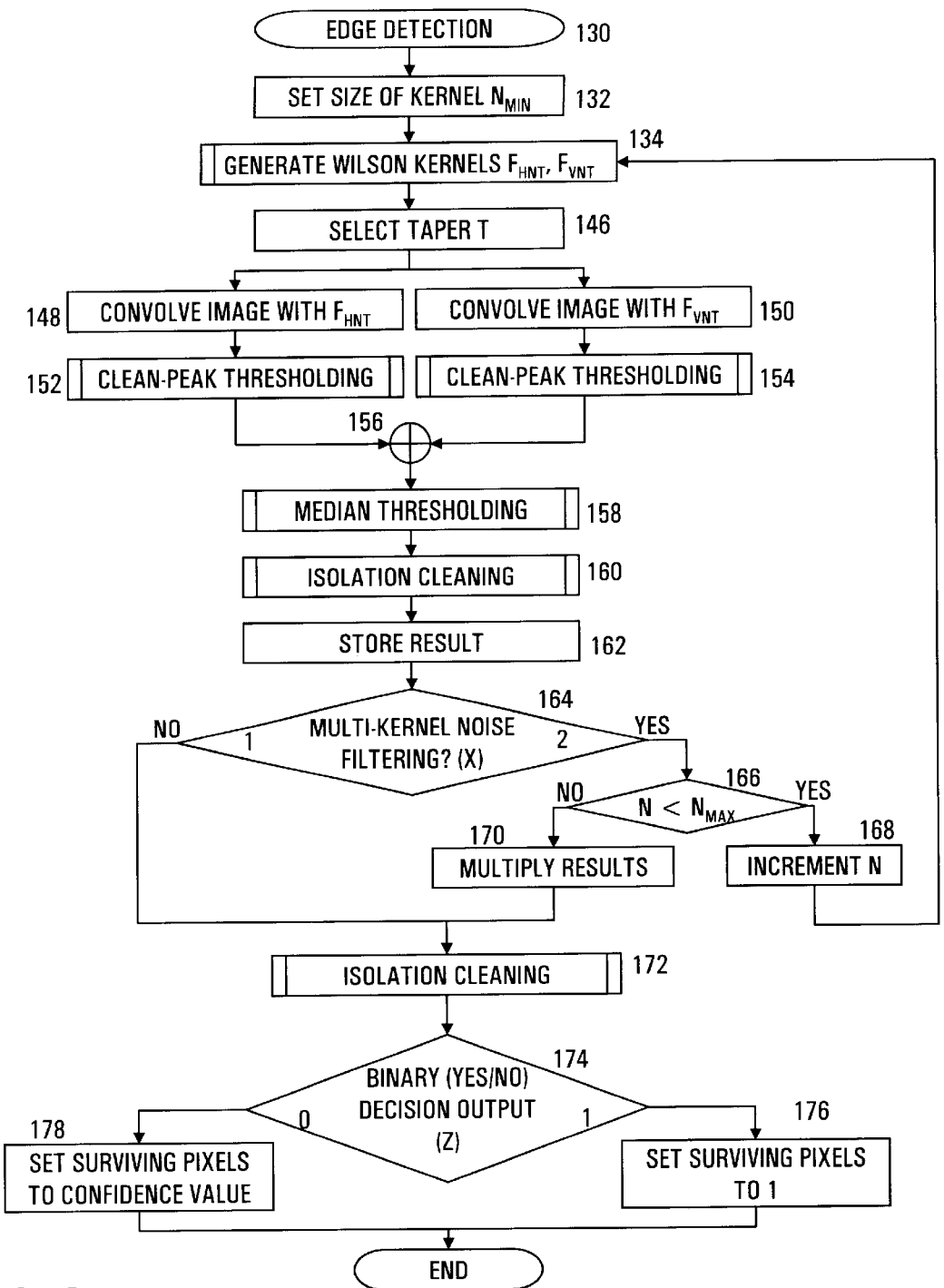
FIG. 3 is a flowchart of a sequence of operations performed by an edge detection routine to detect an edge of arbitrary width in the presence of noise in a digital image.
Figure 4:
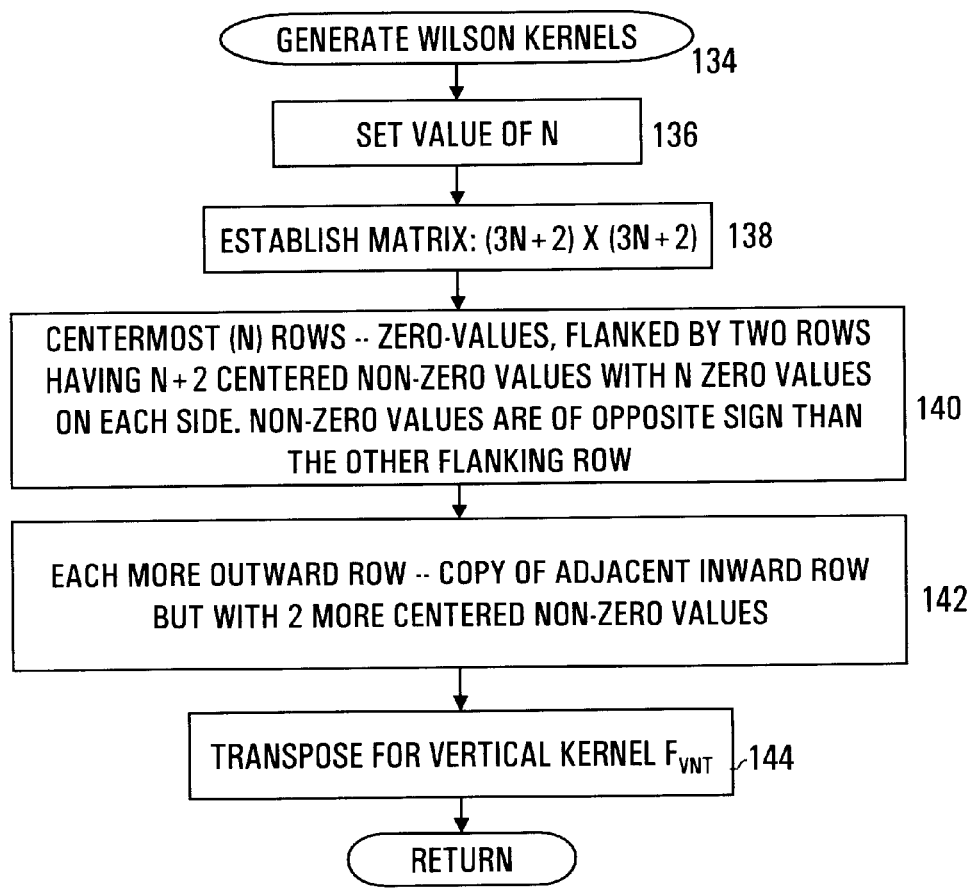
FIG. 4 is a flowchart of a generate Wilson kernels routine referenced in the edge detection routine of FIG. 3.

FIG. 3 illustrates a sequence of operations for edge detection, depicted as routine 130. The size of an edge detection kernel is set to a minimum size $N_{MIN}$ (e.g., 0) without necessarily having a beforehand knowledge of the natural edge size of the digital image or the noise inherent in the image (block 132). A particularly useful type of edge detection kernel, which will be discussed in greater detail below with regard to FIG. 4, is illustrated in Tables 1–4. Specifically, two Wilson kernel classes are introduced, $F_{HNT}$ and $F_{VNT}$, wherein 'H' denotes horizontal, 'V' denotes vertical, 'N' denotes the size, and 'T' refers to the taper of the coefficients of the kernel, which will be discussed below.

TABLE 1

Wilson Kernels $F_{H01}$, $F_{V01}$

| -1 | 1 | -1 | -1 |
|---|---|---|---|
| -1 | 1 | 1 | 1 |

TABLE 2

Wilson Kernels $F_{H11}$, $F_{V11}$

| -1 | 0 | 0 | 0 | 1 | -1 | -1 | -1 | -1 | -1 |
|---|---|---|---|---|---|---|---|---|---|
| -1 | -1 | 0 | 1 | 1 | 0 | -1 | -1 | -1 | 0 |
| -1 | -1 | 0 | 1 | 1 | 0 | 0 | 0 | 0 | 0 |
| -1 | -1 | 0 | 1 | 1 | 0 | 1 | 1 | 1 | 0 |
| -1 | 0 | 0 | 0 | 1 | 1 | 1 | 1 | 1 | 1 |

TABLE 3

Wilson Kernels $F_{H21}$, $F_{V21}$

| -1 | 0 | 0 | 0 | 0 | 0 | 0 | 1 | -1 | -1 | -1 | -1 | -1 | -1 | -1 | -1 |
|---|---|---|---|---|---|---|---|---|---|---|---|---|---|---|---|
| -1 | -1 | 0 | 0 | 0 | 0 | 1 | 1 | 0 | -1 | -1 | -1 | -1 | -1 | -1 | 0 |
| -1 | -1 | -1 | 0 | 0 | 1 | 1 | 1 | 0 | 0 | -1 | -1 | -1 | -1 | 0 | 0 |
| -1 | -1 | -1 | 0 | 0 | 1 | 1 | 1 | 0 | 0 | 0 | 0 | 0 | 0 | 0 | 0 |
| -1 | -1 | -1 | 0 | 0 | 1 | 1 | 1 | 0 | 0 | 0 | 0 | 0 | 0 | 0 | 0 |
| -1 | -1 | -1 | 0 | 0 | 1 | 1 | 1 | 0 | 0 | 1 | 1 | 1 | 1 | 0 | 0 |
| -1 | -1 | 0 | 0 | 0 | 1 | 1 | 1 | 0 | 1 | 1 | 1 | 1 | 1 | 1 | 0 |
| -1 | 0 | 0 | 0 | 0 | 0 | 0 | 1 | 1 | 1 | 1 | 1 | 1 | 1 | 1 | 1 |

TABLE 4

Wilson Kernels $F_{H31}$, $F_{V31}$

| -1 | 0 | 0 | 0 | 0 | 0 | 0 | 0 | 0 | 1 | -1 | -1 | -1 | -1 | -1 | -1 | -1 | -1 | -1 | -1 | -1 |
|---|---|---|---|---|---|---|---|---|---|---|---|---|---|---|---|---|---|---|---|---|
| -1 | -1 | 0 | 0 | 0 | 0 | 0 | 0 | 1 | 1 | 0 | -1 | -1 | -1 | -1 | -1 | -1 | -1 | -1 | -1 | 0 |
| -1 | -1 | -1 | 0 | 0 | 0 | 0 | 1 | 1 | 1 | 0 | 0 | -1 | -1 | -1 | -1 | -1 | -1 | -1 | 0 | 0 |
| -1 | -1 | -1 | -1 | 0 | 0 | 0 | 1 | 1 | 1 | 0 | 0 | 0 | -1 | -1 | -1 | -1 | -1 | 0 | 0 | 0 |
| -1 | -1 | -1 | -1 | 0 | 0 | 0 | 1 | 1 | 1 | 0 | 0 | 0 | 0 | 0 | 0 | 0 | 0 | 0 | 0 | 0 |
| -1 | -1 | -1 | -1 | 0 | 0 | 0 | 1 | 1 | 1 | 0 | 0 | 0 | 0 | 0 | 0 | 0 | 0 | 0 | 0 | 0 |
| -1 | -1 | -1 | -1 | 0 | 0 | 0 | 1 | 1 | 1 | 0 | 0 | 0 | 0 | 0 | 0 | 0 | 0 | 0 | 0 | 0 |
| -1 | -1 | -1 | -1 | 0 | 0 | 0 | 1 | 1 | 1 | 0 | 0 | 0 | 1 | 1 | 1 | 1 | 1 | 0 | 0 | 0 |
| -1 | -1 | -1 | 0 | 0 | 0 | 0 | 1 | 1 | 1 | 0 | 0 | 1 | 1 | 1 | 1 | 1 | 1 | 1 | 0 | 0 |
| -1 | -1 | 0 | 0 | 0 | 0 | 0 | 0 | 1 | 1 | 0 | 1 | 1 | 1 | 1 | 1 | 1 | 1 | 1 | 1 | 0 |
| -1 | 0 | 0 | 0 | 0 | 0 | 0 | 0 | 0 | 1 | 1 | 1 | 1 | 1 | 1 | 1 | 1 | 1 | 1 | 1 | 1 |

With reference to FIG. 4, the generate Wilson kernels routine 134 is depicted for calculating a kernel of any value N as set (block 136). A matrix is formed of size (3N+2)× (3N+2) (block 138). For a horizontal kernel, the middle N rows are given coefficients, or values, of zero (0). These middle N zero rows are flanked on both sides by row with the centermost N+2 coefficients having a nonzero value or opposite sign from the other, flanked by N zero values on each side (block 140). Each more outward row is a copy of its adjacent more inward row, except with two more centered nonzero values (block 142). The Wilson horizontal kernel $F_{HNT}$ is transposed to create the Wilson vertical kernel $F_{VNT}$, as indicated at 144 in FIG. 4.

Such a scheme allows for generation of kernels for any size N, including N=0. Moreover, both horizontal and vertical kernels detect diagonal edges. It should be appreciated that applications consistent with aspects of the invention may utilize other edge detection kernels. In addition, the kernels may be stored as a lookup table or in other available format without having to create a table.

Returning to FIG. 3, the Tables 1–4 illustrate a taper of equal magnitude coefficients for nonzero coefficients (e.g., −1, 1). Other taper functions may be advantageously selected (block 146). For example, for a row described as follows:

$$[-a_{(N+1)} -a_N \ldots a_2\, a_1\, 0 \ldots 0\, a_1\, a_2 \ldots a_N\, a_{(N+1)}],$$

a taper profile includes a maximum at $a_1$ with a minimum at $a_{(N+1)}$. Another taper profile has a maximum at $a_{(N+1)}$ tapering to a minimum at $a_1$, which tends to provide a clean result. Yet another taper profile includes a maximum at $a_{N/2}$ tapering in both directions. Examples of taper functions to provide these tapers include sinusoids and the square root of i/N, where I=1, 2, . . . (N+1).

Then each Wilson kernel is convolved with the digital image (blocks 148, 150). The convolution results are optionally cleaned by clean-peak thresholding (blocks 152, 154) and summed (block 156), discussed in greater detail below. Additional pixel cleaning may optionally include median thresholding (block 158) followed by isolation cleaning (block 160). In an illustrative embodiment, further optional pixel cleaning may be selected by repeating block 158, then block 160, then block 150 again.

The results are stored (block 162), advantageously allowing multiple passes of edge detection to be performed, suggested by the determination as to whether multi-kernel noise filtering (X=2) is selected (block 164). If so, then a determination is made as to whether the size of the kernel N is less than a predetermined maximum kernel size (block 166). If the maximum has not been reached, then the size N is incremented (block 168) and control returns to block 134. If reached, then the results from use of each kernel are multiplied (block 170).

Multiplying the results from the various kernels takes advantage of the spectral properties of the kernels. Detection of infinitesimally thin edges is essentially a high pass filtering operation, which unfortunately includes much of the noise. Tailoring the kernels to find border regions with finite thickness rejects the high frequency components of the image, reducing the noise power and improving the Signal to Noise Ratio (SNR). As can be expected from basic Fourier Transform theory, as the kernel becomes wider, the bandwidth used in the detection process becomes narrower. This does reach a practical limit, though, as kernels must be small enough relative to image dimensions to capture detail. Since there is some overlap between the pass bands of each of the different kernels, it is possible to apply several operations using different widths (N), to take the absolute value of each convolution, and to then multiply the products together. The result is a more highly filtered set of detected edges with reduced noise.

If multi-kernel noise filtering was not selected in block 164 (X=1) or after multiplying the results in block 170, then optional isolation cleaning is performed (block 172). Then a determination is made as to whether a binary (yes/no) decision output is desired (Z=1) (block 174), and if so, surviving pixels are set to 1 (block 176), else surviving pixels are set to confidence values (block 178). The confidence value refers to normalizing against the largest value in the result.

Figure 5:
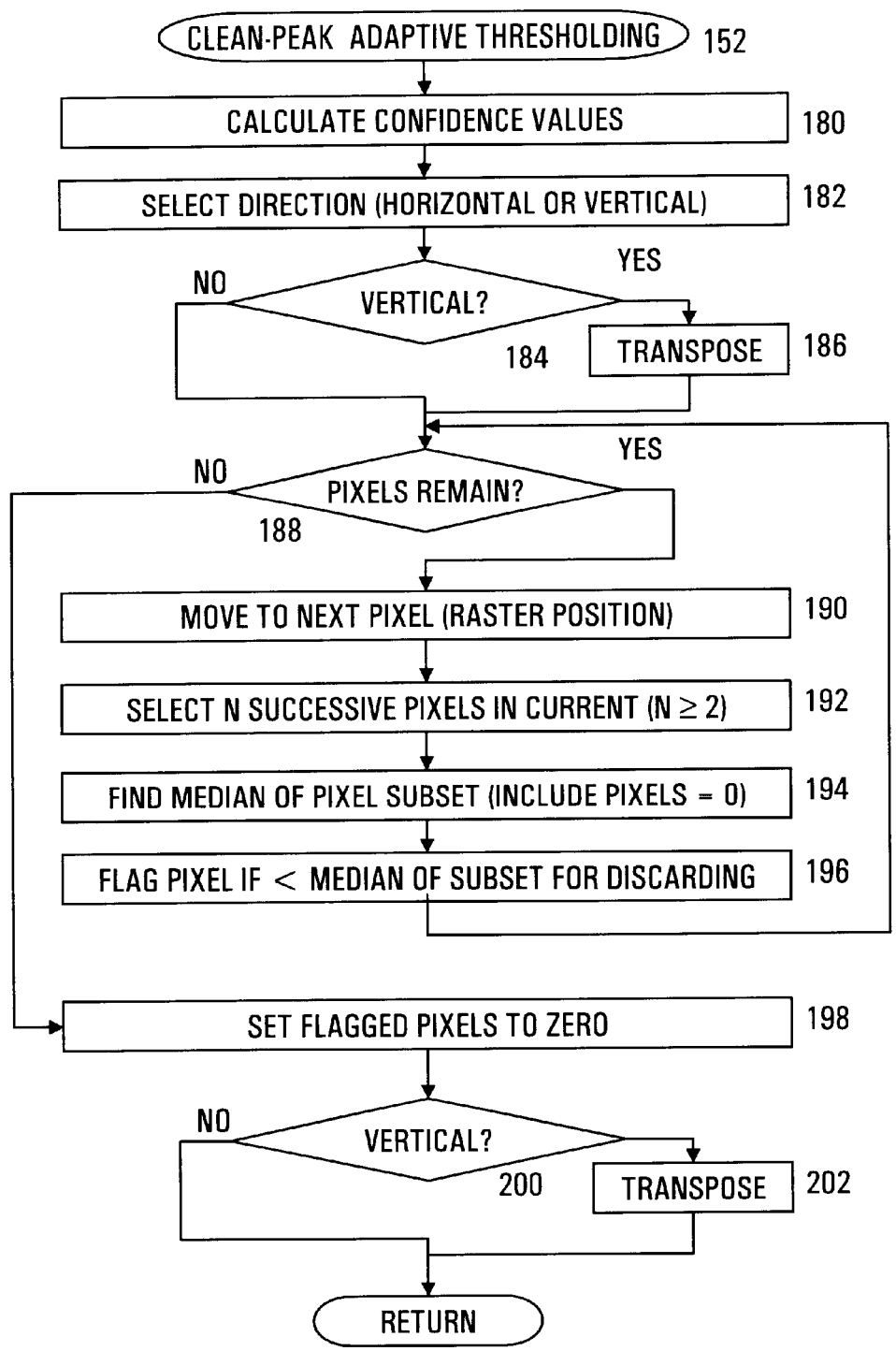
FIG. 5 is a flowchart of a clean-peak adaptive threshold routine referenced in the edge detection routine of FIG. 3.
Figure 6:
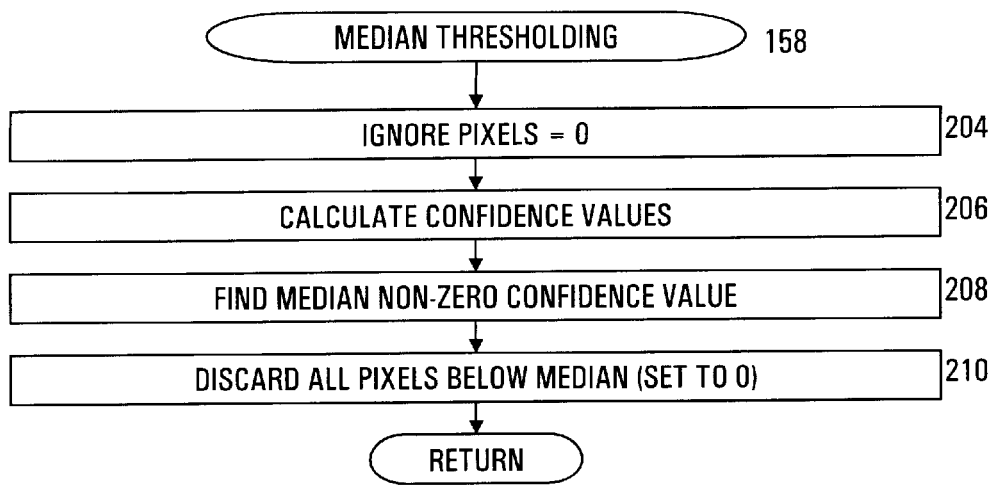
FIG. 6 is a flowchart of a median thresholding routine referenced in the edge detection routine of FIG. 3.
Figure 7:
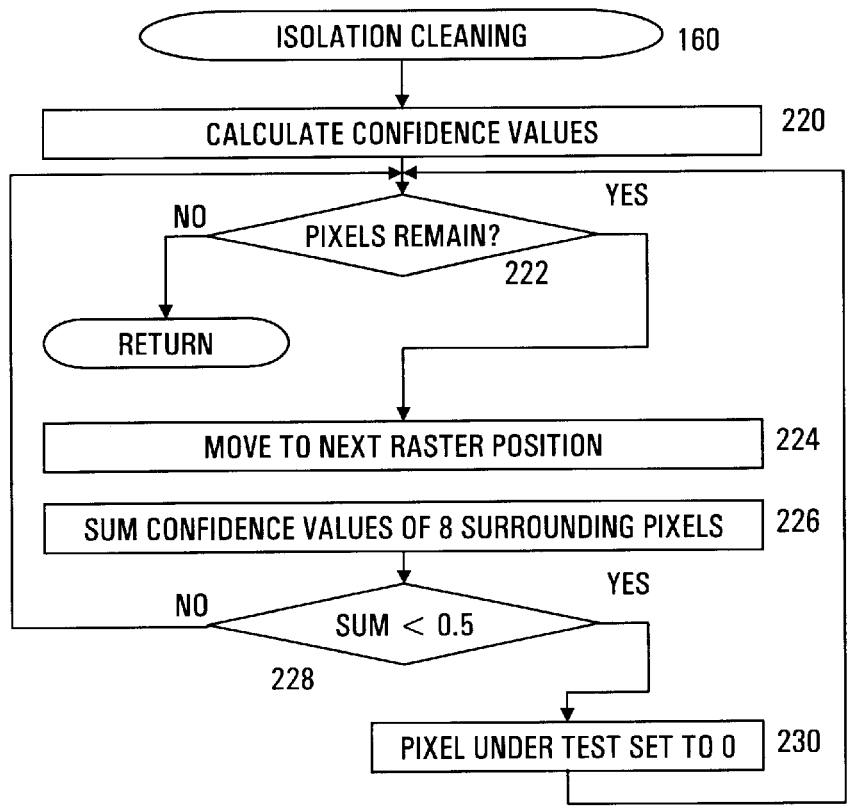
FIG. 7 is a flowchart of an isolation cleaning routine referenced in the edge detection routine of FIG. 3.

The various types of pixel cleaning operations referenced in FIG. 3 are depicted in greater detail in FIGS. 5–7. With reference to FIG. 5, the clean-peak thresholding routine 152 begins by calculating confidence values for each of the pixels (block 180). Direction of clean is selected, horizontal or vertical (block 182). If vertical is selected (block 184), then the result is transposed (block 186).

Application of a kernel to a bitmap image is described hereafter as being performed as a raster scan. In the illustrative method, the Wilson kernel is applied in the manner of a raster scan as used in computer and video graphic displays. In particular, displaying or recording a video image in computer monitors and TV's is line by line, based on the way in which a cathode ray tube electron gun is directed. Electrons are beamed (scanned) onto the phosphor coating on the screen a line at a time from left to right starting at the top-left corner. At the end of the line, the beam is turned off and moved back to the left and down one line, which is known as the horizontal retrace (fly back). When the bottom-right corner is reached, a vertical retrace (fly back) returns the gun to the top-left corner. In a TV signal, this is known as the vertical blanking interval. It will be appreciated by those skilled in the art having the benefit of the present disclosure that a kernel may be applied in various manners since the order in which pixels are tested is not critical to the result.

After horizontal is selected in block 184 or after being transposed in block 186, then each pixel is tested. Specifically, a determination is made as to whether any pixels remain to be tested (block 188). If so, then the next raster position in the image is selected (block 190). A subset of N successive pixels at the current pixel position is selected (block 192). Consequently, N should be greater than or equal to 2. The median of the subset is determined, including pixels having a value of zero (0) (block 194). The pixel under test is flagged for later discarding if below the median for the subset (block 196). Then control returns to block 188 for testing for additional pixels, and if none, then flagged pixels are discarded by setting each to zero (0) (block 198).

Then, if the processing was for results from a vertical kernel (block 200), then the cleaned result is transposed (block 202). Routine 152 is complete if not vertical in block 200 or after being transposed in block 202.

FIG. 6 illustrates the median thresholding routine 158 that includes ignoring pixels having a value of zero (0) (block 204). The confidence value for each pixel is calculated (block 206). The median for non-zero confidence values is found (block 208) and all nonzero pixels below the median are discarded by setting to zero (0) (block 210).

FIG. 7 depicts the isolation cleaning routine 160 that begins by calculating confidence values (block 220). Then, each pixel is tested for being an isolated pixel for cleaning. Specifically, a determination is made as to whether additional pixels remain to be tested (block 222), and if so, the next raster position is tested (block 224). The confidence values for all surrounding pixels are summed (block 226). If the sum is less than 0.5 (block 228), then the pixel under test is set to zero (0) as being an isolated pixel (block 230). If not under 0.5 in block 228, then control returns to block 222 until all pixels have been tested and the routine returns.

Figure 8:
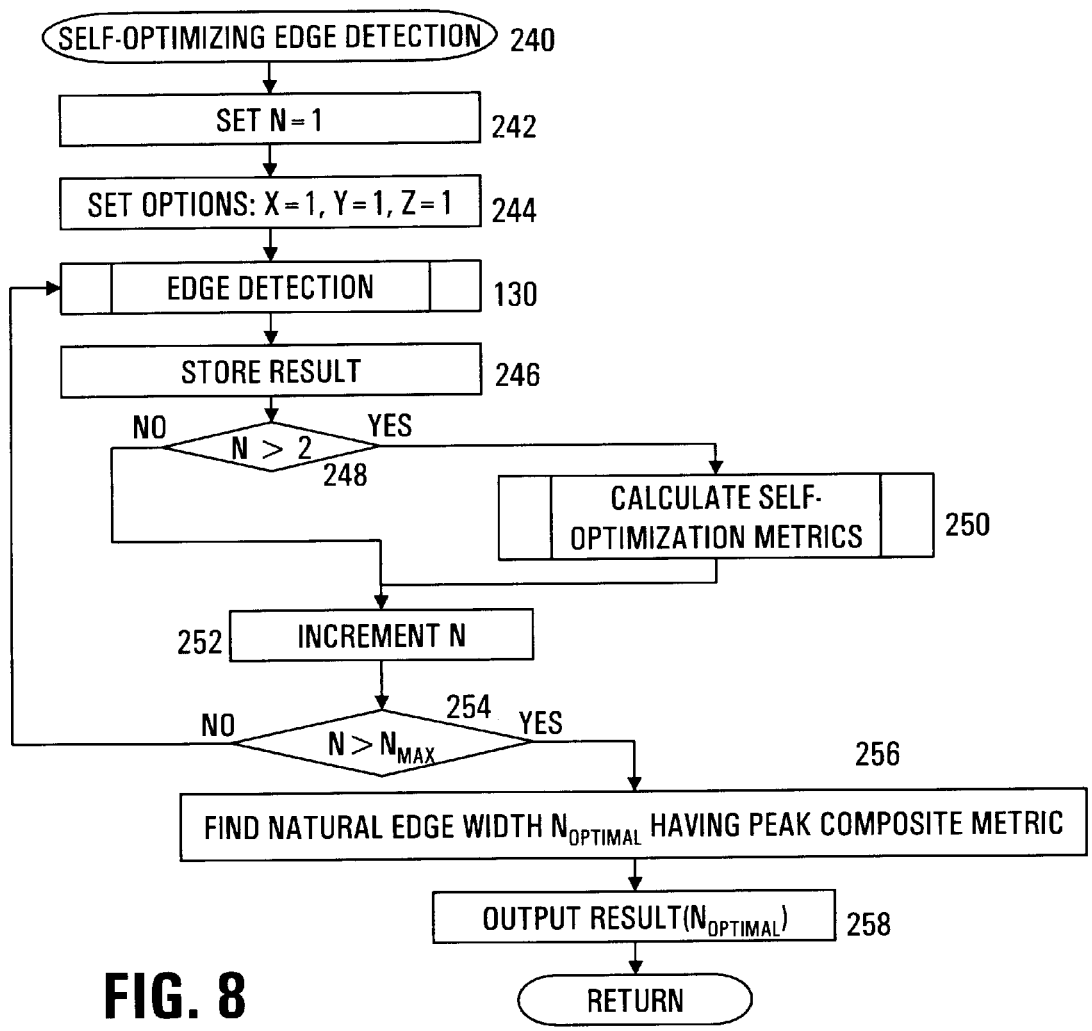
FIG. 8 is a flowchart of a sequence of operations, or routine, for self-optimizing edge detection, which references the edge detection routine of FIG. 3.

FIG. 8 illustrates an advantage of the ability to scale the edge detection kernels to the natural edge of a digital image. Specifically, a self-optimizing edge detection routine 240 iteratively locates an optimum kernel for a blurred image having noise. The routine 240 does not require a beforehand knowledge of the clarity of the image or the type of edges contained therein in order to perform edge detection. First, the size of the kernel is set to N=1 (thus, a 5×5 kernel) (block 242). The options for utilizing the edge detection routine 130 are set to X=1, Y=1, Z=1 (block 244). Specifically, multiplying results of edge detection operations is turned off, clean-peak thresholding is selected, and binary output is selected. Then, edge detection routine 130 is run and the results for this pass is stored (block 246).

If the kernel size N is greater than 2 (block 248), then self-optimization metrics are calculated (block 250). If N is not greater than 2 or after calculating metrics, then N is incremented (block 252). Then, if N is not greater than a predetermined maximum N (block 254), then control returns to block 130 to perform the next pass. If the maximum allowable size for the kernel has been reached in bock 254, then a natural edge width $N_{OPTIMAL}$ is determined by locating a peak composite metric (block 256) and the corresponding pass for this kernel size is output (block 258).

Figure 9:
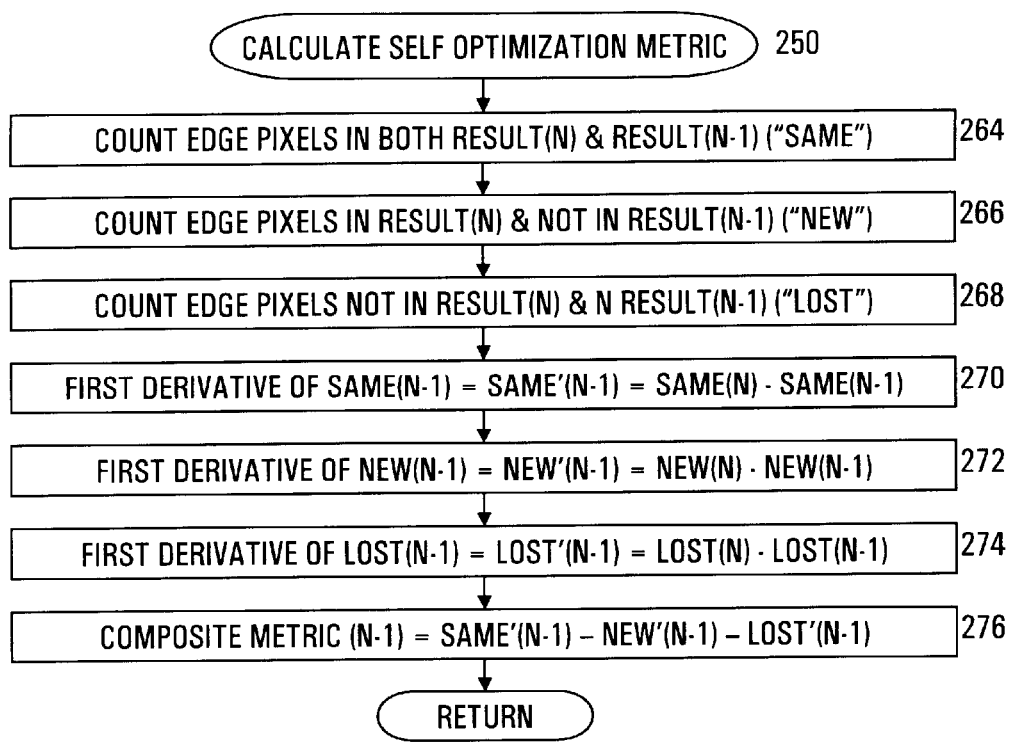
FIG. 9 is a flowchart of a calculate self-optimization metric routine referenced in the self-optimizing edge detection routine of FIG. 8.

With reference to FIG. 9, the calculate self-optimization metric routine 250 referenced in FIG. 8 is depicted wherein the greatest change in pixels deemed to be an edge is found. In particular, first edge pixels are counted that are both in the Result(N) and the previous Result(N−1) and this count is the referred to as "Same" (block 264). The edge pixels are counted that were not in the previous Result (N−1) but are in the current Result(N) and referred to as "New" (block 266). Also, edge pixels were in the previous Result(N−1) but are not in the current Result(N) are counted and referred to as "Lost" (block 268). A first derivative of "Same" is estimated: Same'(N−1)=Same(N)-Same(N−1) (block 270). A first derivative of "New" is estimated: New'(N−1)=New(N)-New(N−1) (block 272). Also, a first derivative of "Lost" is estimated: Lost'(N−1)=Lost(N)-Lost(N−1) (block 274). The composite metric for Result(N−1) is then Same'(N−1)-New'(N)-Lost'(N) (block 276).

Figure 10:
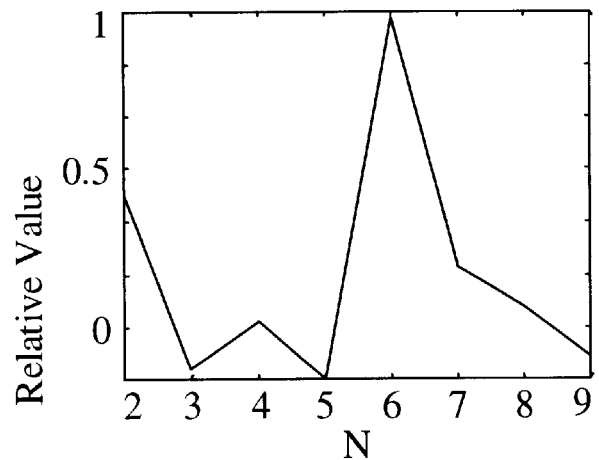
FIG. 10 is an illustrative example of results from the self-optimization metric routine of FIG. 9.

In the illustrative example, the composite metric is shown in FIG. 10, wherein the kernel of size N=6 is optimum. With reference to FIG. 11, a photograph of a grid shadow was intentionally created with significant blur in order to simulate an image collected with resolution exceeding the practical limit. Blur is the result of representing an image at a higher resolution than the true level of detail supported by the collection process and equipment. This photograph of FIG. 11 underwent self-optimizing edge detection routine 240, resulting in the various Results shown in FIGS. 11A–11I. The optimal size 6 thus corresponds to the output image depicted in FIG. 11F.

In use, a digital image undergoes successive convolutions with increasing sizes of Wilson vertical and horizontal edge detecting kernels with optional pixel cleaning processes to reduce noise in the output. The spatial bandwidth of successive passes provides an opportunity to reduce noise by multiplying the results of multiple passes. Alternatively, the ability of to find the natural edge of an over magnified or blurred image is supported by a self-optimizing edge detection routine that increases the size of the kernels used until the optimum is found.

By virtue of the foregoing, there is thus provided self-optimizing general edge detection that performs well in both noisy and blurred images and is suitable for use in imagery where conventional techniques begin to fail. The technique recognizes that edges may actually be transition regions of nontrivial finite width, and so it is able to find edges that span several pixels. Since kernels are generated according to a well-defined algorithm, the kernels are created for specified edge width under test, giving the technique scale independence. Combining kernels of differing sizes reduces vulnerability of the process to noise, giving the process improved noise tolerance.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A method of detecting a multi-pixel edge region in a digital image containing noise, the method comprising:
   selecting a first edge detection kernel configured to detect edges having a first pixel width;
   convolving the digital image with the first edge detection kernel to obtain a first result;
   selecting a second edge detection kernel configured to detect edges having a second pixel width;
   convolving the digital image with the second edge detection kernel to obtain a second result; and
   performing an edge detection operation in response to the first and second results to create an output result.

2. The method of claim 1, further comprising performing a pixel cleaning operation.

3. The method of claim 2, wherein performing the pixel cleaning operation comprises performing a selected at least one of median thresholding, isolation cleaning, and clean peak adaptive thresholding.

4. The method of claim 3, wherein performing median thresholding comprises:
   calculating a confidence value for each pixel;
   determining a median confidence value for pixels having a non-zero confidence value; and
   discarding non-zero confidence values below the median confidence value.

5. The method of claim 3, wherein performing isolation cleaning comprises:
   calculating a confidence value for each pixel; and
   for each pixel, summing confidence values for surrounding pixels and discarding the pixel under test in response to the sum falling below a predetermined threshold.

6. The method of claim 3, wherein performing clean-peak adaptive thresholding for a selected one of horizontal and vertical directions comprises:
   for each pixel, finding a median of a predetermined pixel subsequent near pixel under test; and
   in response to the pixel under test having a value less than the median, flagging the pixel for subsequently setting to zero after remaining pixels are tested.

7. The method of claim 2, wherein performing the edge detection operation comprises:
   calculating an edge detection metric on each of the first and second results after each result has undergone a pixel cleaning operation; and
   selecting one of the first and second results based on the edge detection metric.

8. The method of claim 7, wherein calculating the edge detection metric comprises:
   determining a rate of change in pixels deemed an edge between the cleaned first and second results; and
   selecting a result associated with a maximum rate of change in pixels.

9. The method of claim 1, wherein performing the edge detection operation comprises multiplying the first and second results to obtain a noise filtered result.

10. The method of claim 1, wherein selecting the first and second edge detection kernels comprises selecting respective horizontal and vertical edge detection kernels, and respective convolving the digital image comprises summing results from respective convolutions of the digital image with both horizontal and vertical edge detection kernels.

11. The method of claim 10, wherein selecting respective horizontal and vertical edge detection kernels comprises:
   selecting an integer number N;
   establishing a square matrix of size (3N+2)×(3N+2);
   setting values for centermost N+2 rows to zero;
   flanking the centermost N+2 rows on one side with a row having N+2 nonzero middle values between N zero values on each side, and on another side with a row having N+2 nonzero middle values of opposite sign as the one side row;
   setting each outward row to values of an adjacent, inward row except decreasing by one the zero values on each side, thereby forming a Wilson vertical kernel; and
   transposing the Wilson vertical kernel to form a Wilson horizontal kernel.

12. The method of claim 11, wherein the nonzero values are multiplied by a taper function applied to columns of a horizontal edge detection kernel and to rows of a vertical edge detection kernel.

13. The method of claim 1, further comprising: converting the output result to a binary output result in accordance with a predetermined threshold applied to each pixel.

14. An apparatus, comprising:
   a memory containing a program configured to select a first edge detection kernel configured to detect edges having a first pixel width, to convolve the digital image with the first edge detection kernel to obtain a first result, to select a second edge detection kernel configured to detect edges having a second pixel width, convolve the digital image with the second edge detection kernel to obtain a second result, and to perform an edge detection operation in response to the first and second results to create an output result; and
   computing circuitry coupled to the memory for executing the program.

15. The apparatus of claim 14, wherein the program is configured to perform the edge detection operation by calculating an edge detection metric on each of the first and second results after each result has undergone a pixel cleaning operation, and by selecting one of the first and second results based on the edge detection metric.

16. The apparatus of claim 14, wherein the program is configured to perform the edge detection operation by multiplying the first and second results to obtain a noise filtered result.

17. A program product, comprising:

a program configured to select a first edge detection kernel configured to detect edges having a first pixel width, to convolve the digital image with the first edge detection kernel to obtain a first result, to select a second edge detection kernel configured to detect edges having a second pixel width, convolve the digital image with the second edge detection kernel to obtain a second result, and to perform an edge detection operation in response to the first and second results to create an output result; and a signal bearing media bearing the program.

18. The program product of claim 17, wherein the signal bearing media is transmission type media.

19. The program product of claim 17, wherein the signal bearing media is recordable media.

* * * * *